United States Patent
Chou et al.

(10) Patent No.: US 8,102,379 B2
(45) Date of Patent: Jan. 24, 2012

(54) TOUCH SENSING DEVICE AND TOUCH SENSING APPARATUS

(75) Inventors: Chung-Cheng Chou, Lujhu Township, Taoyuan County (TW); William Wang, Taoyuan (TW); Chia-Hung Hsu, Sijhih (TW); Chin-Yung Chen, Dasi Township, Taoyuan County (TW)

(73) Assignee: Raydium Semiconductor Corporation, Hsinchu (TW)

( * ) Notice: Subject to any disclaimer, the term of this patent is extended or adjusted under 35 U.S.C. 154(b) by 828 days.

(21) Appl. No.: 12/139,833

(22) Filed: Jun. 16, 2008

(65) Prior Publication Data

US 2009/0242281 A1    Oct. 1, 2009

(30) Foreign Application Priority Data

Mar. 26, 2008 (TW) ................ 97110679 A

(51) Int. Cl.
*G06F 3/041* (2006.01)
*B41J 2/41* (2006.01)
*G02B 26/00* (2006.01)

(52) U.S. Cl. .......... 345/173; 347/112; 359/296

(58) Field of Classification Search .......... 345/107, 345/173; 178/18.01, 18.03, 20.01; 359/296; 427/214; 257/192; 385/129; 252/299.01
See application file for complete search history.

(56) References Cited

U.S. PATENT DOCUMENTS

| | | | |
|---|---|---|---|
| 6,310,614 B1 | 10/2001 | Maeda et al. | |
| 6,407,763 B1 * | 6/2002 | Yamaguchi et al. | 347/112 |
| 6,671,081 B2 | 12/2003 | Kawai | |
| 6,738,050 B2 * | 5/2004 | Comiskey et al. | 345/173 |
| 7,760,416 B2 * | 7/2010 | Kawai et al. | 359/296 |
| 2003/0067666 A1 * | 4/2003 | Kawai | 359/296 |
| 2007/0085838 A1 | 4/2007 | Ricks et al. | |
| 2007/0157040 A1 * | 7/2007 | Glass et al. | 713/300 |
| 2007/0171512 A1 * | 7/2007 | Lee | 359/296 |
| 2007/0177094 A1 | 8/2007 | Van Dam et al. | |
| 2007/0263306 A1 | 11/2007 | Hayes et al. | |
| 2008/0018611 A1 * | 1/2008 | Serban et al. | 345/173 |
| 2008/0048989 A1 * | 2/2008 | Yoon et al. | 345/173 |

FOREIGN PATENT DOCUMENTS

| | | |
|---|---|---|
| CN | 1950725 | 4/2007 |
| TW | 454139 | 9/2001 |
| TW | 594974 | 6/2004 |

* cited by examiner

*Primary Examiner* — Quan-Zhen Wang
*Assistant Examiner* — Lin Li
(74) *Attorney, Agent, or Firm* — Muncy, Geissler, Olds & Lowe, PLLC

(57) ABSTRACT

The invention discloses a touch sensing device, which includes a containing space, a first substrate layer, a second substrate layer, a driver, and a sensor. The first substrate layer and the second substrate layer define the containing space for containing a fluid. The driver can provide charges to a first conducting layer of the first substrate layer, a second conducting layer of the second substrate layer, and the fluid. The sensor can sense the electric characteristics of the fluid. When a point unit approaches the touch sensing device and influences the charges, the appearance of the fluid could be changed and then the electric characteristics could also be changed.

12 Claims, 7 Drawing Sheets

TOUCH SENSING DEVICE AND TOUCH SENSING APPARATUS

BACKGROUND OF THE INVENTION

1. Field of the Invention

The invention relates to a touch sensing device and a touch sensing apparatus using the touch sensing device, and particularly, the invention relates to a touch sensing device proceeding touch sensing through electrowetting effect and a touch sensing apparatus using the touch sensing device.

2. Description of the Prior Art

Touch panel originated from the idea of electric touch sensing interface brought up by Dr. Samuel Hurst in the year 1971, and then the first touch panel appeared in the year 1974. Touch panel was firstly developed by the American army for military purposes, and after the technology was transferred to the non-governmental circles, it was developed for various applications.

Nowadays, because of the high development of wireless network and electronic industry, portable electronic devices with wireless communication and small size, such as, Personal Digital Assistant (PDA) or mobile phone, are used in various occasions to meet the demands of the market. The small size touch panel which has both the advantages of simple operation and small volume gradually replaces traditional input devices, such as keyboard, mouse, trackballs, and so on, because of the portability and functions.

Touch panels could be divided into resistive, capacitive, optical, and ultrasonic touch panels. The resistive touch panel is formed by two Indium Tin Oxides (ITO) conductive layers with one above the other. When an object touches one of the ITO conductive layers to make it deform to contact the other of the ITO conductive layers, the panel forms a voltage variation which could be sensed by a controller, so as to calculate the position of the contact point for input.

The capacitive touch panel generates induced current to sense the position of the contact point according to the capacity variation generated by static electricity combination of transparent electrodes arranged in order and the object contacting the panel.

The principle of the optical touch panel is assigning infrared ray senders and receivers to make the infrared ray in the panel arranged in matrix of X axis and Y axis. The opaque object would interdict the infrared ray at the contact point when it contacts the panel, and the position of the contact point could be decided according to the coordinates of the interdicted infrared ray.

The surface of the ultrasonic touch panel is made of glass, and the ultrasonic wave senders configured at the corner of the panel form a uniform sound wave field at the center area of the panel. When a soft object contacts the panel, the ultrasonic wave would be absorbed and then the intensity thereof decreases. According to the decay of the intensity of the received signal, the controller can calculate the position of the contact point.

Following the development of the touch sensing technique, the portable electronic device could be provided with more functions and the operation thereof could be more convenient and direct. For example, multiple touch sensing make the touch panel execute more complex input orders, and the user can easily make these orders without memorizing more input method. On the other hand, the touch panel could also be used for measuring the contacting force and pressure.

However, to achieve the above-mentioned functions of the portable electronic device, the design of the circuits and the electrodes of the touch panel would be complex, therefore, the transparency thereof is easily influenced and then the intensity of the light emitted from the display panel under the touch panel is also decreased by the touch panel. As seen above, the illumination of the image displayed by portable electronic device would be insufficient and hurts the sight of the user. On the other hand, the manufacturer may increase the intensity of the light emitted from the display panel for the image illumination, and then it causes power consumption of the portable electronic device.

SUMMARY OF THE INVENTION

Therefore, a scope of the invention is to provide a highly transparent touch sensing apparatus using electrowetting effect to solve the above-mentioned problem.

According to an embodiment, the touch sensing apparatus of the invention comprises a touch sensing device, and the touch sensing device further comprises a containing space, a first substrate layer, a second substrate layer, a driver, and a sensor. The first substrate layer has a first dielectric layer and a first conductive layer. The second substrate layer has a second dielectric layer and a second conductive layer. The first substrate layer and the second substrate layer can define the containing space for containing a fluid, wherein the fluid can contact the first dielectric layer and the second dielectric layer. The driver can provide at least one first charge to the first conductive layer, at least one second charge to the second conductive layer, and at least one third charge to the fluid respectively, wherein the polarity of the first charge is the same with that of the second charge but different from that of the third charge. The sensor can sense the electric characteristic of the fluid.

In this embodiment, the first charges, the second charges, and the third charges determine the geometric appearance of the fluid. Besides, the electric characteristic of the fluid is determined according to the geometric appearance, the fluid characteristics, and the quantity of the third charges. When an object with the fourth charges approaches the first substrate layer and the fourth charges influencing the first charges, the geometric appearance of the fluid would change and it causes the electric characteristic of the fluid to change. The change of the electric characteristic could be sensed by the sensor.

Furthermore, the touch sensing apparatus further comprises a processing unit besides the touch sensing device. In this embodiment, the sensor generates a sensing signal according to the electric characteristic, and the processing unit can receive the sensing signal and determining a touch state of the touch sensing apparatus according to the sensing signal.

Another scope of the invention is to provide a touch sensing apparatus using electrowetting effect, and the touch sensing apparatus could be used for sensing the magnitude of the external force applied thereon.

According to an embodiment, the touch sensing apparatus of the invention comprises a touch sensing device, and the touch sensing device further comprises a containing space, a first substrate layer, a second substrate, a driver, and a sensor. The second substrate layer has a dielectric layer and a conductive layer. The first substrate layer and the second substrate layer can define the containing space for containing the fluid. The driver can provide at least one first charge to the conductive layer and at least one second charge to the fluid, wherein the polarity of the first charge is the same with that of the second charge. The sensor could be used for sensing the electric characteristic of the fluid.

In the embodiment, when the first substrate layer of the touch sensing device receives an external force which exceeds an external force threshold, the first substrate layer deforms and presses the fluid to change the geometric appearance and the electric characteristic of the fluid. The variation of the electric characteristic could be sensed by the sensor.

Furthermore, the touch sensing apparatus further comprises a processing unit besides the touch sensing device. In this embodiment, the sensor generates a sensing signal according to the electric characteristic, and the processing unit can receive the sensing signal and determining a touch state of the touch sensing apparatus according to the sensing signal.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
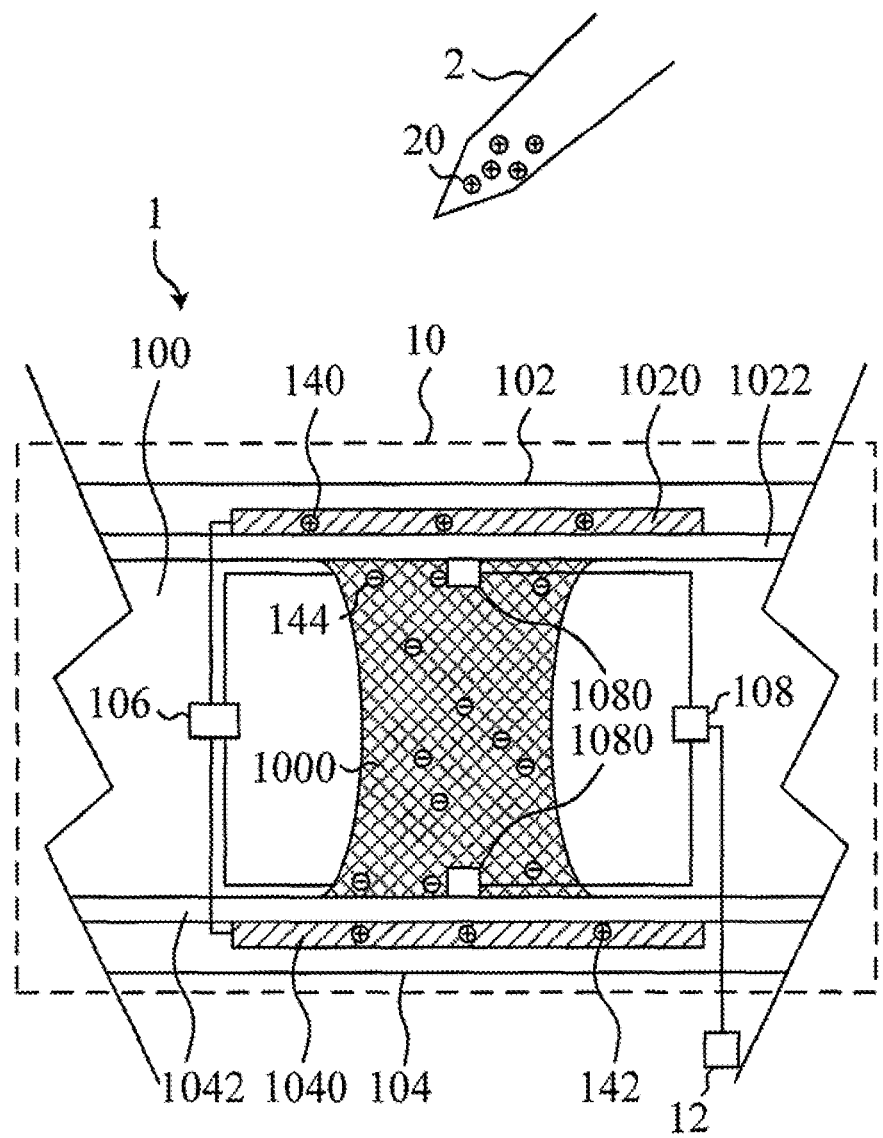
FIG. 1A is a schematic diagram illustrating a touch sensing apparatus according to an embodiment of the invention.

Please refer to FIG. 1A. FIG. 1A is a schematic diagram illustrating a touch sensing apparatus 1 according to an embodiment of the invention. As shown in FIG. 1A, the touch sensing apparatus 1 comprises a touch sensing device 10 and a processing unit 12. The touch sensing device 10 further comprises a containing space 100, a first substrate layer 102, a second substrate layer 104, a driver 106, and a sensor 108.

In the embodiment, the first substrate layer 102 comprises a first conductive layer 1020 and a first dielectric layer 1022; the second substrate layer 104 comprises a second conductive layer 1040 and a second dielectric layer 1042. The first substrate layer 102 and the second substrate layer 104 define the containing space 100 for containing a fluid 1000, wherein the fluid 1000 contacts the first dielectric layer 1022 and the second dielectric layer 1042. In practice, a side wall could be configured on the side of the containing space to prevent the fluid from leaking out from the containing space and damaging the touch sensing apparatus. Besides, in the embodiment, the first substrate layer 102 and the second substrate layer 104 are made of transparent materials, and the fluid 1000 is transparent and conductive fluid. However, in practice, the first substrate layer 102 and the second substrate 104 could be translucent or opaque materials, and the fluid 1000 could also be translucent or opaque.

The sensor 108 has sensing units 1080 for sensing the electric characteristic of the fluid 1000 and then generating a sensing signal. In the embodiment, the sensing units 1080 are conductive contacts configured on the first dielectric layer 1022 and the second dielectric layer 1042, however, in practice, the configuration and the quantity of the sensing units are determined according to the requests of the user or the designer but not limited to this embodiment.

Before the operation of the touch sensing apparatus 1, the driver 106 can provide at least one first charge 140 to the first conductive layer 1020, at least one second charge 142 to the second conductive layer 1040, and at least one third charge 144 to the fluid 1000, wherein the first charge 140 and the second charge 142 are positive polarization and the third charge 144 is negative polarization. In practice, the first charge 140 and the second charge 142 could be the same polarization, and the third charge 144 could be different polarization with the first charge 140 and the second charge 142. It should be noted that in practice the quantity of the first charges 140, the second charges 142, and the third charges 144 are not necessary the same with those shown in FIG. 1, and it is determined according to the requests of the user or the designer. Besides, in practice, the driver 106 can further comprise driving units configured in the fluid for providing charges to the fluid, and the driving unit could also be combined with the sensing unit as a unit with compound functions.

According to electrowetting effect, the fluid 1000 presents a geometric appearance as shown in FIG. 1A. The geometric appearance would change with the variation of the relative quantity of the first charges 140, the second charges 142, and the third charges 144.

When a point unit 2 approaches the first substrate layer 102 and the distance between the point unit 4 and the first substrate layer 102 is smaller than or equal to a threshold, the fourth charges 20 can influence the quantity of the first charges 140. It should be noted that the threshold is related to the material of the first substrate layer 102. If the threshold is zero, it means that the point unit 2 changes the first charges 140 by a conductive way that contacts the first substrate layer 102; on the other hand, if the threshold is not zero, it means that the point unit 2 changes the first charges 140 by an inductive way without contacting the first substrate layer 102. When the first charges 140 are changed, the geometric appearance and the electric characteristic of the fluid 1000 change. In the embodiment, the electric characteristic of the fluid 1000 is the equivalent resistance of the fluid 1000. However, the electric characteristic of the fluid 1000 could be other appropriate characteristics.

According to another embodiment, the first substrate layer 102 in FIG. 1A could be made of elastic material, and the first substrate layer 102 generates deformation to press the fluid 1000 when an external force is applied on the first substrate layer 102. Therefore, when the point unit 2 contacts the first substrate layer 102, a pressure is applied to the first substrate layer 102, so that the first substrate layer 102 and the fluid are made to deform and then the electric characteristic of the fluid is changed following the deformation.

Figure 1B:
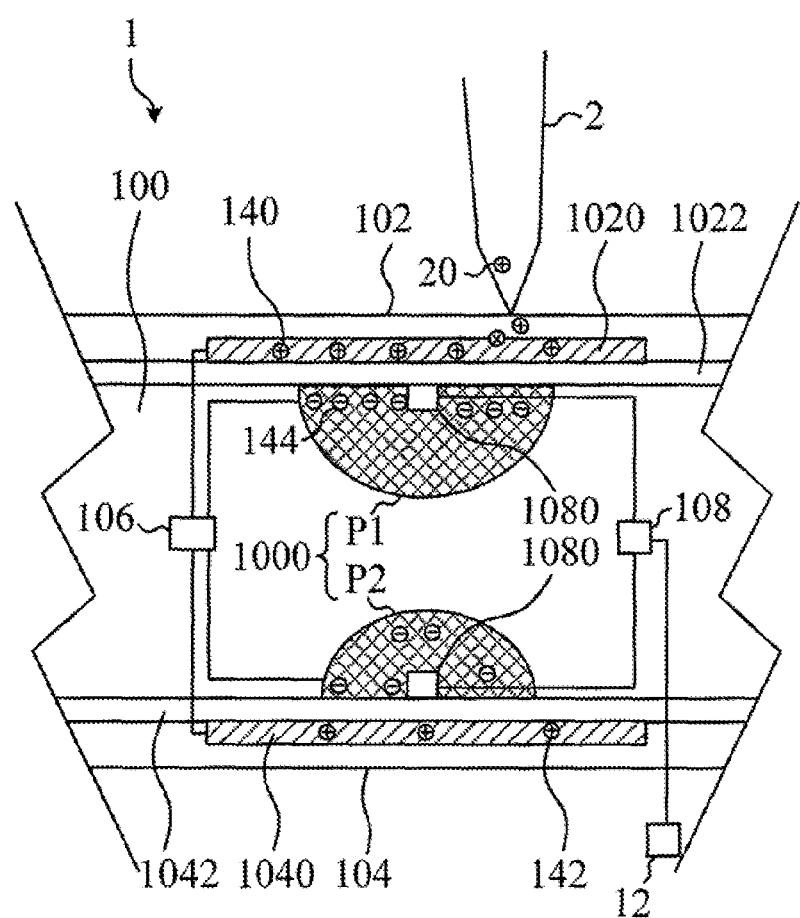
FIG. 1B is a schematic diagram illustrating that a point unit contacts a touch sensing apparatus according to an embodiment of the invention.

The sensor 108 is used for sensing the electric characteristic of the fluid 1000. In the embodiment, when the electric characteristic, i.e., equivalent resistance, of the fluid 1000 is changed, a sensing signal is generated according to the electric characteristic. However, the electric characteristic of the fluid 1000 still varies slightly because of outside interference, even if the point unit 2 does not approach the touch sensing apparatus 1. Therefore, in practice, the sensing unit could be set for generating the sensing signal once the sensed variation of the electric characteristic exceeds a threshold to avoid the noise. For example, as shown in FIG. 1B, the point unit 2 contacts the touch sensing apparatus 1 to make the geometric appearance of the fluid 1000 become a first fluid part P1, adhering to the first dielectric layer 1022; and a second fluid part P2, adhering to the second dielectric layer 1042, where the equivalent resistance sensed by two sensing units 1080, configured on the first dielectric layer 1022 and the second dielectric layer 1042 respectively, is very high in the open state. Therefore, the sensor can generate different sensing signals or selectively generates sensing signals according to the close state or the open state.

In practice, the touch sensing apparatus 1 could be used for sensing the contacting pressure. For example, if the first substrate layer 102 is elastic and the geometric appearance of the fluid 1000 is controlled to change to the first fluid part P1 and the second part P2 as shown in FIG. 1B, and when the point unit 2 contacts and applies the pressure exceeding a threshold on the first substrate layer 102, the first fluid part P1 and the second fluid part P2 can contact each other to make the sensor 108 sense the variation of the electric characteristic to judge the deformation level of the first substrate layer 102. The pressure applied on the first substrate layer 102 could be calculated according to the deformation level of the first substrate layer 102.

Besides, the processing unit 12 could be used for receiving the sensing signal generated by the sensor 108, and determines the touch state of the touch sensing apparatus 1 according to the sensing signal. Once the point unit 2 moves away, the driver 106 can recover the quantity of the first charges 140, the second charges 142, and the third charges 144, so as to recover the geometric appearance and the electric characteristic of the fluid 1000 to the state before touch sensing.

The above-mentioned touch sensing apparatus can further comprises a plurality of touch sensing devices in practice. The sensor configured in each of the touch sensing devices can sense the touch state of each of the touch sensing devices, therefore, multiple touch sensing could be achieved.

The touch sensing process of the above-mentioned embodiment is based on that the outside influence increases the electrowetting effect, and then the variation of the electric characteristic of the fluid is sensed for determining the touch state. The touch sensing could be operated through close/open state or measuring the equivalent resistances under different geometric appearances with precise sensing unit. However, when the polarity of the charges carried by the point unit is different from that of the first charges of the touch sensing apparatus, the electrowetting effect would be decreased at touch sensing. For keeping effective induction of the touch sensing, various assistant designs could be applied besides the above-mentioned precise sensing unit for measuring the electric characteristic of the fluid.

For example, a point unit with specific polarization, such as a touch pen, is used to replace other point units with unspecific polarization, such as a finger, for touch sensing, so as to ensure the variation of the electric characteristic of the fluid is large enough to influence the former circuit state at touch sensing. Furthermore, an adjustment area could be configured on the surface of the point unit, and the adjustment area can measure the polarity and quantity of the charges on the surface of the point unit before touch sensing. According to the result of measuring, the driver is controlled to provide the charges with corresponding polarity to touch sensing apparatus, so as to ensure the variation of the electric characteristic of the fluid is large enough to influence the former circuit state at touch sensing.

On the other hand, because the first substrate layer, the second substrate layer, and the fluid are highly transparent, a light can pass through the touch sensing apparatus when the light incidents into the touch sensing apparatus. Therefore, the touch sensing apparatus of the invention could be used for touch processing apparatus, such as, but not limited to, a PDA or a mobile phone. Besides, the fluid can change the direction of the incident light because of the geometric appearance thereof at touch sensing, and if the fluid keeps the geometric appearance at touch sensing, even when the point unit is removed from the touch sensing apparatus, the user can observe differences of the light characteristics between the touched area and other area, so as to make the touch sensing apparatus of the invention achieve the function of handwriting.

Figure 2A:
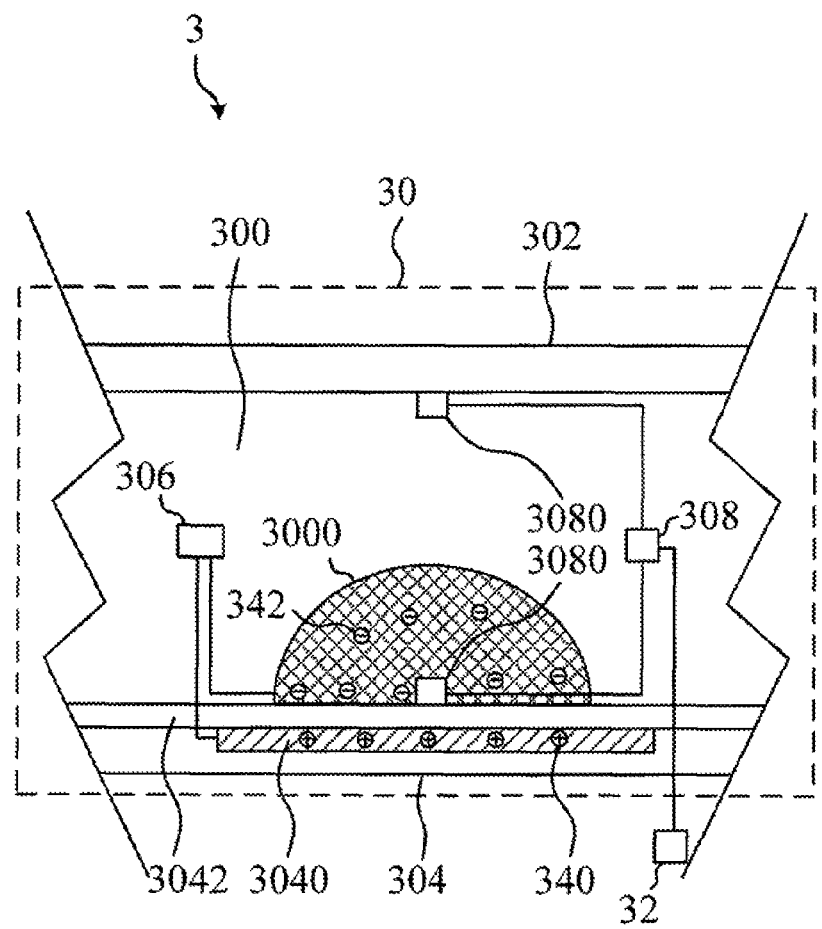
FIG. 2A is schematic diagram illustrating a touch sensing apparatus according to an embodiment of the invention.

Please refer to FIG. 2A. FIG. 2A is schematic diagram illustrating a touch sensing apparatus 3 according to an embodiment of the invention. As shown in FIG. 2A, the touch sensing apparatus 3 comprises a touch sensing device 30 and a processing unit 32. The touch sensing device 30 further comprises a containing space 300, a first substrate layer 302, a second substrate layer 304, a driver 306, and a sensor 308.

In the embodiment, the second substrate layer 304 comprises a conductive layer 3040 and a dielectric layer 3042. The first substrate layer 302 and the second substrate layer 304 can define the containing space 300 for containing a fluid 3000, wherein the fluid 3000 contacts the dielectric layer 3042. It should be noted that a side wall could be configured on the side of the containing space to prevent the fluid from leaking out from the containing space and then damaging the touch sensing apparatus in practice. Similarly, the first substrate layer 302 and the second substrate layer 304 are made of transparent materials, and the fluid 3000 is a kind of transparent and conductive fluid.

The sensor 308 has sensing units 3080 for sensing the electric characteristic of the fluid 3000 and then generating a sensing signal. In the embodiment, the sensing units 3080 are conductive contacts configured on the first substrate 302 and the dielectric layer 3042. However, in practice, the configuration and quantity of the sensing units are determined according to the requests of the user or the designer but not limited to the embodiment.

In this embodiment, the driver 306 can provide at least one first charge 340 to the conductive layer 3040 and at least one second charge 342 to the fluid 3000. The fluid 3000 presents a geometric appearance as shown in FIG. 2A according to the electrowetting effect. Besides, the driver 306 can change the geometric appearance of the fluid 3000 by providing different quantity of the first charges 340 and the second charges 342. Similarly, the driver can further comprise driving unit configured in fluid for providing charges to the fluid.

Figure 2B:
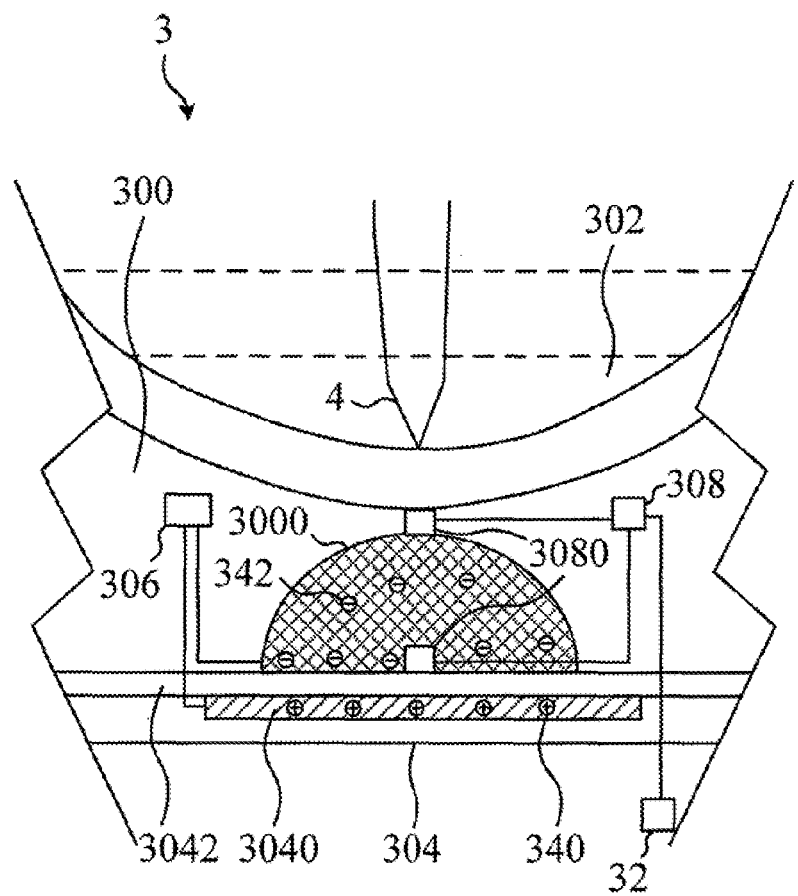
FIG. 2B is a schematic diagram illustrating that a point unit contacts and applies an external force to the touch sensing apparatus in FIG. 2A.

The first substrate layer 302 can be made of elastic material in this embodiment, and the first substrate layer 302 would deform when an external force is applied thereon. Please refer to FIG. 2B. FIG. 2B is a schematic diagram illustrating that a point unit 4 contacts and applies an external force to the touch sensing apparatus 3 in FIG. 2A. As shown in FIG. 2B, the driver 306 provides first charges 340 and second charges 342 to make the fluid 3000 present the geometric appearance as shown in the figure. When the external force applied by the point unit 4 exceeds an external force threshold, the deformation of the first substrate layer 302 makes the sensing unit 3080 located on the first substrate layer 302 contact the fluid 3000, and the sensor 308 senses that the open state becomes the close state in circuit and that generates the sensing signal. The processing unit 32 could be used for receiving sensing signal and determining a touch state according to the sensing signal.

The relation between the external force applied and the deformation can be calculated according to the material characteristics of the first substrate layer 302. Therefore, the external force applied by the point unit 4 to the first substrate layer 302 could be calculated according to the material characteristics of the first substrate layer 302 when the processing unit 32 judges that the touch state changes, i.e., in this embodiment, the open state becomes the close state in circuit. Furthermore, the external force threshold in this embodiment could be indirectly controlled through the driver 308 controlling the geometric appearance of the fluid 3000.

In practice, the first substrate layer could also be designed as a structure with a conductive layer and a dielectric layer. The driver provides charges to the conductive layer of the first substrate layer, the conductive layer of the second substrate layer, and the fluid. When the point unit presses the first substrate layer and the external force applied by the point unit achieves an external force, the two fluid parts contact each other and then the open state becomes the close state in the circuit sensed by the sensor, so as to generate the sensing signal to the processing unit.

Figure 2C:
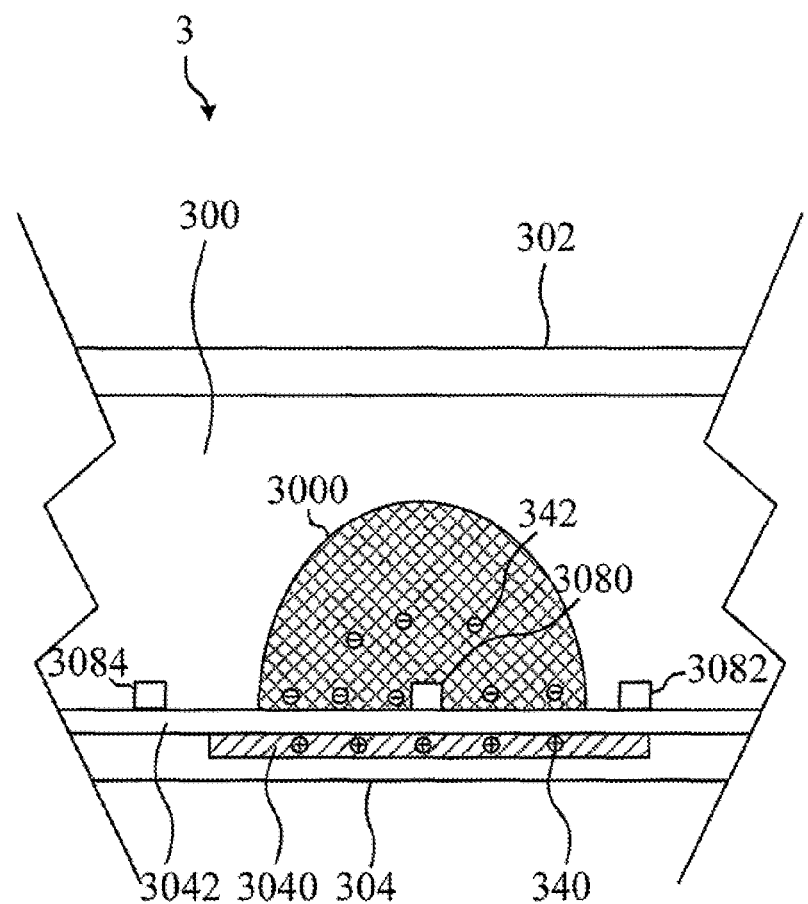
FIG. 2C is a schematic diagram illustrating a touch sensing apparatus according to another embodiment of the invention.
Figure 2D:
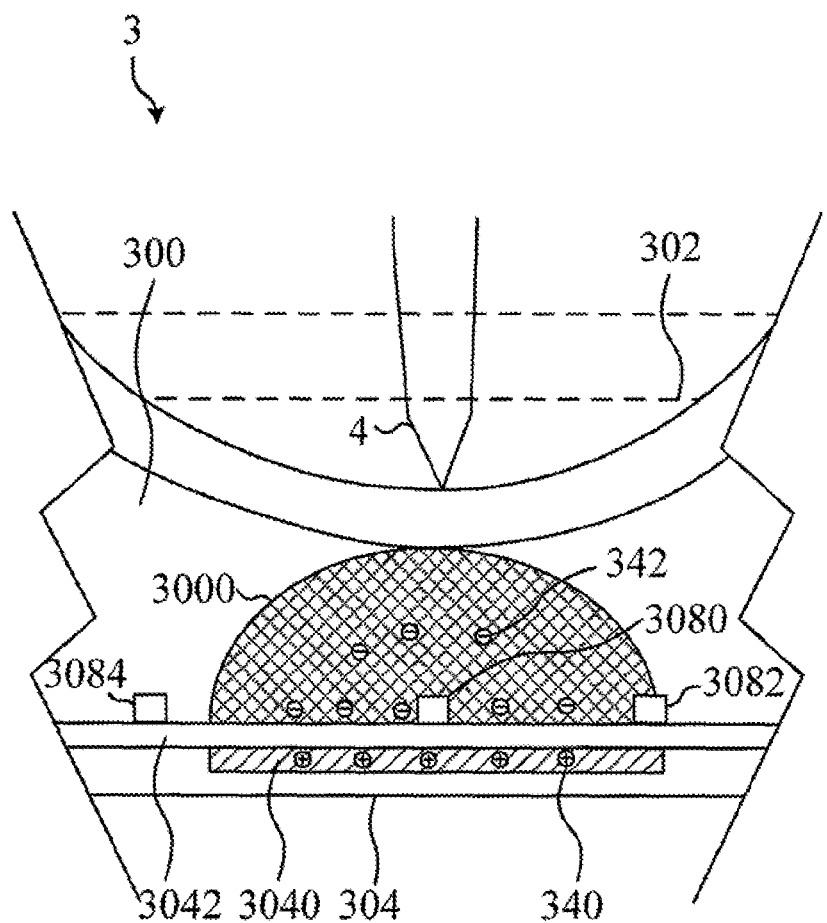
FIG. 2D is a schematic diagram illustrating that a point unit contacts and applies an external force to the touch sensing apparatus in FIG. 2C.
Figure 2E:
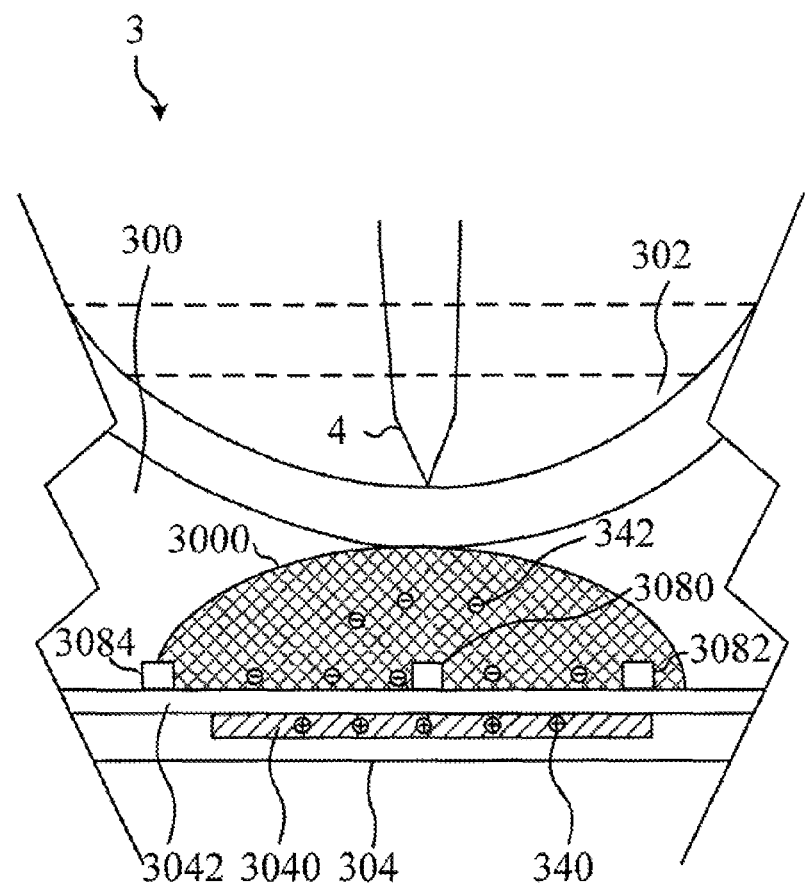
FIG. 2E is a schematic diagram illustrating that a point unit contacts and applies an external force to the touch sensing apparatus in FIG. 2C.

Please refer FIG. 2C, FIG. 2D, and FIG. 2E. FIG. 2C is a schematic diagram illustrating a touch sensing apparatus 3 according to another embodiment of the invention; FIG. 2D is a schematic diagram illustrating that a point unit 4 contacts and applies an external force to the touch sensing apparatus 3 in FIG. 2C; FIG. 2E is a schematic diagram illustrating that a point unit 4 contacts and applies an external force to the touch sensing apparatus 3 in FIG. 2C. As shown in FIG. 2C, the difference between this embodiment and the last embodiment is that the sensing unit 3080, 3082, and 3084 of the sensor are configured on the second substrate layer 304, where the other portions are the same with those in the above-mentioned embodiment and are not described here. It should be noted that the sensor, the driver, and the processing unit are not illustrated here for the simplicity of the figures. The driver provides the first charges 340 and the second charges 342 to make the fluid 3000 present the geometric appearance as shown in the figures.

In the embodiment, the distance between the sensing unit 3080 to the sensing unit 3082 is smaller than the distance between the sensing unit 3080 to the sensing unit 3084. When the point unit 4 applies an external force to the first substrate layer 302 that exceeds a first external force threshold, the first substrate layer 302 presses the fluid 3000 and then the fluid 3000 contacts the sensing unit 3082, as shown in FIG. 2D. At this moment, the sensor can sense that the circuit state between the sensing unit 3080 and the sensing unit 3082 changes from the open state to the close state, and then generates a sensing signal to the processing unit.

Furthermore, when the point unit 4 increases the external force to exceed a second external force threshold, the first substrate layer 302 would further press the fluid 3000 and then the fluid 3000 contacts the sensing unit 3084, as shown in FIG. 2E. At this moment, the sensor can sense that the circuit state between the sensing unit 3080 and the sensing unit 3084 changes from the open state to the close state, and then generates a sensing signal to the processing unit.

In practice, a plurality of sensing units could be configured on the second substrate layer, where the fluid contacts one of the sensing units (defined as a first sensing unit) but not contact others of the sensing units (defined as second sensing units), in addition, each of the second sensing units has a different distance to the first sensing unit. When the point unit contacts and presses the first substrate layer, the fluid is pressed and may contact the second sensing units. The magnitude of the external force applied by the point unit to the first substrate layer could be judged according to the farthest second sensing unit conducting with the first sensing unit or the quantity of the close states.

From the above-mentioned description, when the fluid is pressed to contact a second sensing unit to make a close state, it means that the external force applied by the point unit exceeds the first external threshold or the second external threshold corresponding to the second sensing unit. Therefore, the external force could be judged as a value between two different external force thresholds according to the farthest second sensing unit conducting with the first sensing unit or the quantity of the close states, so as to determine the magnitude of the external force. It should be noted that the external force threshold corresponding to the second sensing unit could be determined according to the material characteristics of the first substrate layer, the distance from the second unit to the first unit, the fluid characteristics, the volume of the fluid, and so on.

Compared with the prior art, the touch sensing apparatus and the touch sensing device of the invention can change the former charges condition of the touch sensing apparatus and the touch sensing device through the charges condition of the contacting object, where the geometric appearance and the electric characteristic of the fluid in the touch sensing apparatus and the touch sensing device could be changed according electrowetting effect, and then the electric characteristic of the fluid is measured to determine the touch state. Because each portion of the touch sensing apparatus and the touch sensing device can be made of transparent material, the touch sensing apparatus and the touch sensing device themselves have highly transparency. Besides, the touch sensing apparatus can comprise a plurality of touch sensing touch sensing apparatus devices to achieve multiple touch sensing function. On the other hand, the touch sensing apparatus can measure the external force applied thereon according to the different charges condition provided to the touch sensing device.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A touch sensing device, comprising:
    a first substrate layer comprising a first dielectric layer and a first conductive layer;
    a second substrate layer comprising a second dielectric layer and a second conductive layer, wherein a containing space is defined by the first substrate layer and the second substrate layer for containing a fluid, and the fluid contacting the first dielectric layer and/or the second dielectric layer;
    a driver for providing at least one first charge to the first conductive layer, at least one second charge to the second conductive layer, and at least one third charge to the fluid, wherein the polarity of the first charge is the same with that of the second charge but different from that of the third charge; and
    a sensor comprising at least one sensing unit configured in the containing space, for sensing an electric characteristic of the fluid;
wherein the first charges, the second charges, and the third charges determine a geometric appearance of the fluid; wherein when a point unit with at least one fourth charge approaches the first substrate layer and the distance between the point unit and the first substrate is smaller than a threshold, the fourth charges influencing the first charges, so as to change the geometric appearance of the fluid and then change the electric characteristic of the fluid.

2. The touch sensing device of claim 1, wherein the at least one sensing unit further comprises:
   a first conductive contact configured in the fluid adjacent to the first substrate layer; and
   a second conductive contact configured in the fluid adjacent to the second substrate layer;
wherein the sensor senses the electric characteristic of the fluid through the first conductive contact and the second conductive contact.

3. The touch sensing device of claim 1, wherein the electric characteristic is an equivalent resistance of the fluid.

4. The touch sensing device of claim 1, wherein the first substrate layer is elastic, and the first substrate layer deformating when an external force is applied thereon.

5. A touch sensing apparatus for applying in a touch processing apparatus, the touch sensing apparatus comprising:
   a first substrate layer comprising a first dielectric layer and a first conductive layer;
   a second substrate layer comprising a second dielectric layer and a second conductive layer, wherein a containing space is defined by the first substrate layer and the second substrate layer for containing a fluid, and the fluid contacting the first dielectric layer and/or the second dielectric layer;
   a driver for providing at least one first charge to the first conductive layer, at least one second charge to the second conductive layer, and at least one third charge to the fluid, wherein the polarity of the first charge is the same with that of the second charge but different from that of the third charge;
   a sensor comprising at least one sensing unit configured in the containing space, for sensing an electric characteristic of the fluid and generating a sensing signal according to the electric characteristic of the fluid; and
   a processing unit for receiving the sensing signal and determining a touch state of the touch sensing apparatus according to the sensing signal;
wherein the first charges, the second charges, and the third charges determine a geometric appearance of the fluid; wherein when a point unit with at least one fourth charge approaches the first substrate layer and the distance between the point unit and the first substrate is smaller than a threshold, the fourth charges influencing the first charges, so as to change the geometric appearance of the fluid and then change the electric characteristic of the fluid.

6. The touch sensing apparatus of claim 5, wherein the at least one sensing unit further comprises:
   a first conductive contact configured in the fluid adjacent to the first substrate layer; and
   a second conductive contact configured in the fluid adjacent to the second substrate layer
wherein the sensor senses the electric characteristic of the fluid through the first conductive contact and the second conductive contact.

7. The touch sensing apparatus of claim 5, wherein the electric characteristic is an equivalent resistance of the fluid.

8. The touch sensing apparatus of claim 5, wherein the first substrate layer is elastic, and the first substrate layer deforming when an external force is applied thereon.

9. The touch sensing apparatus of claim 5, wherein the geometric appearance of the fluid, influenced by the fourth charges, changes to a first fluid part adhering to the first dielectric layer and a second fluid part adhering to the second dielectric layer.

10. The touch sensing apparatus of claim 9, wherein the first fluid part and the second fluid part are capable of changing the direction of an incident light.

11. The touch sensing apparatus of claim 5, wherein the touch processing apparatus is a Personal Digital Assistant (PDA).

12. The touch sensing apparatus of claim 5, wherein the touch processing apparatus is a mobile phone.

* * * * *